April 18, 1933.    J. D. MORGAN    1,904,508
REDUCTION FURNACE
Filed April 17, 1931    2 Sheets-Sheet 1
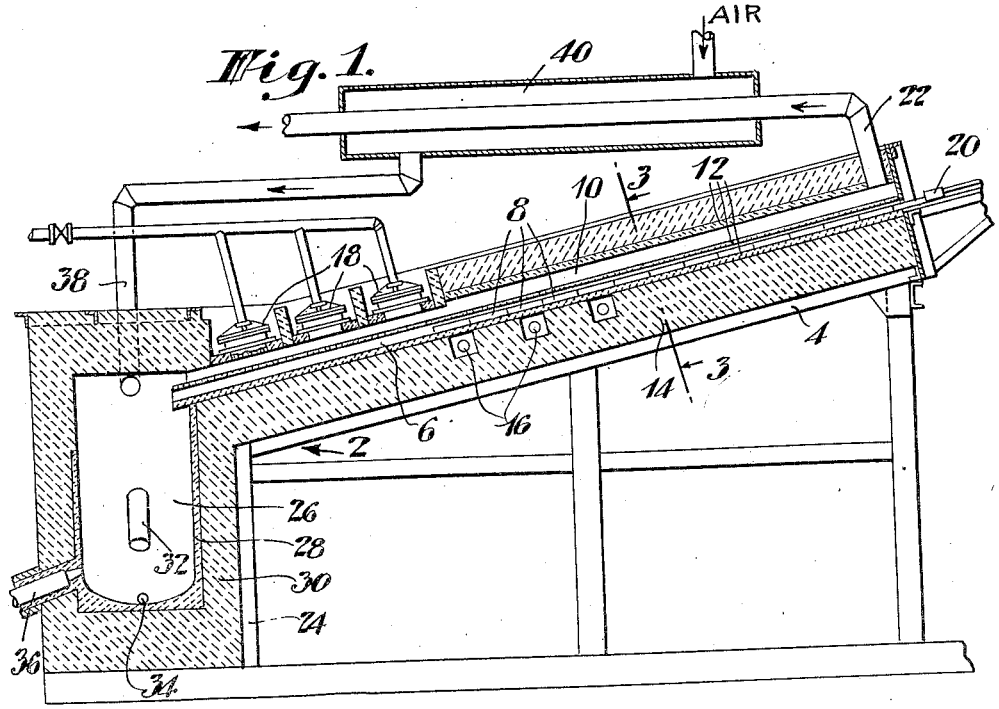
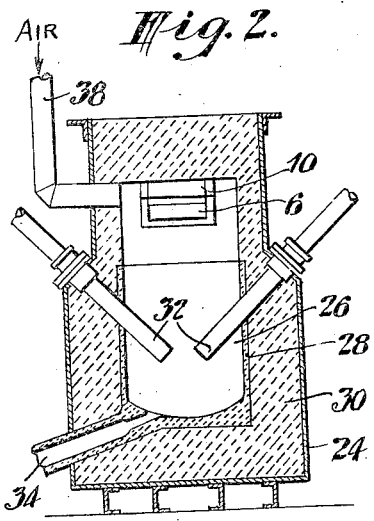
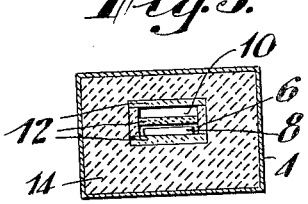
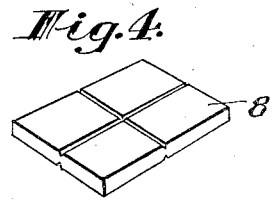
Inventor
JOHN D. MORGAN
By his Attorney April 18, 1933. J. D. MORGAN 1,904,508
REDUCTION FURNACE
Filed April 17, 1931 2 Sheets-Sheet 2
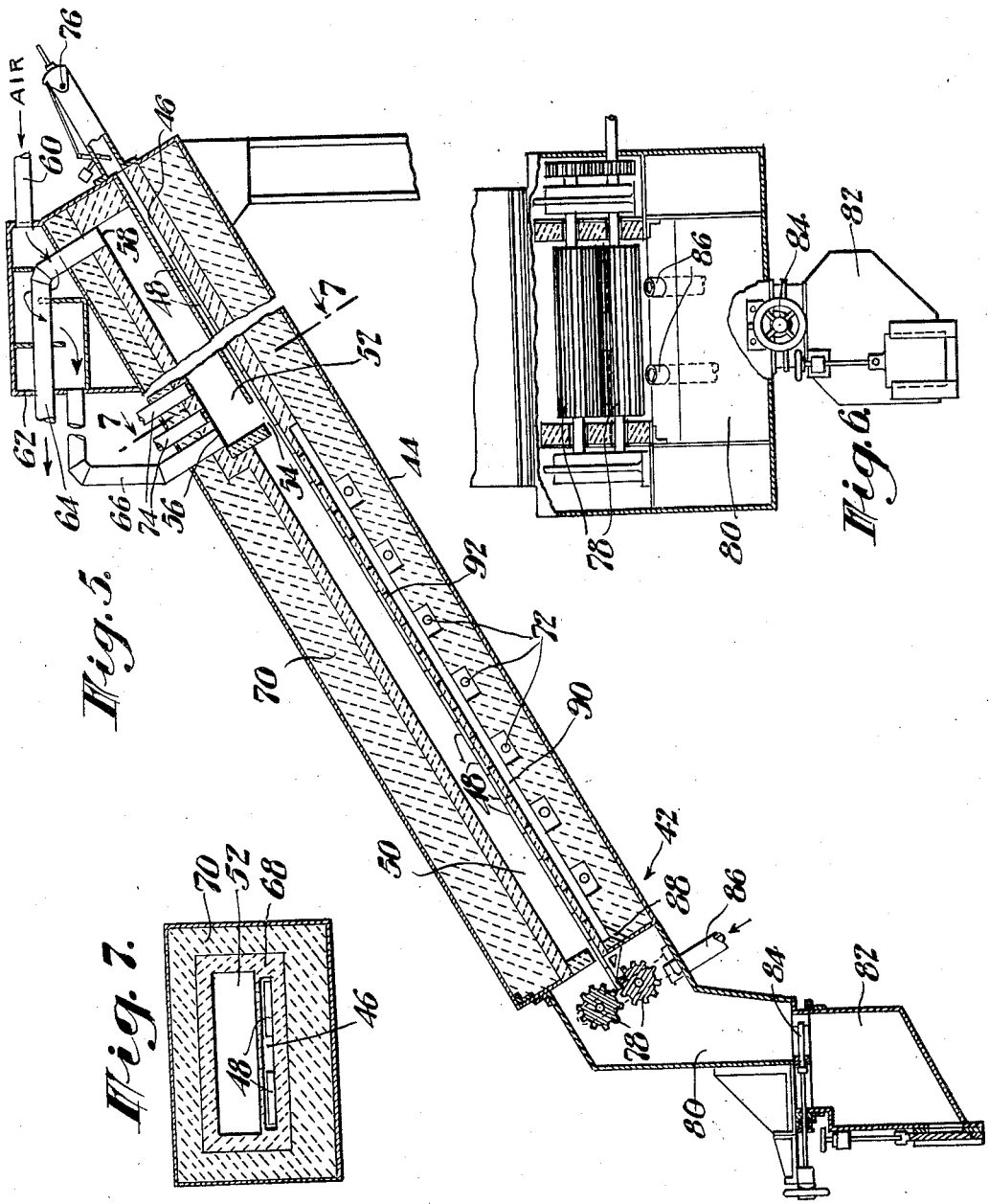
Inventor
JOHN D. MORGAN
By his Attorney
Edmund G. Borden Patented Apr. 18, 1933

1,904,508

UNITED STATES PATENT OFFICE

JOHN D. MORGAN, OF SOUTH ORANGE, NEW JERSEY, ASSIGNOR TO DOHERTY RESEARCH COMPANY, OF NEW YORK, N. Y., A CORPORATION OF DELAWARE

REDUCTION FURNACE

Application filed April 17, 1931. Serial No. 530,796.

This invention relates to furnaces for production of phosphorus and for similar purposes, and more particularly to an improved reduction furnace adapted to reduce a charge in such a manner as to allow a continuous operation of the apparatus. This application is a continuation in part of pending application Serial No. 312,574 filed October 15th, 1928.

The existing forms of apparatus which may be operated to reduce natural rock phosphates and for similar purposes give at best but a faulty and inefficient operation in that they merely superficially preheat the charge to only a comparatively low temperature thus placing the burden of reduction in one limited portion of the apparatus. In addition such existing forms of apparatus do not operate to preheat the complete charge to partially reduce the same but merely to regenerate a portion of the heat of the gases leaving the apparatus.

Accordingly one of the objects of the present invention is to provide a form of apparatus for the continuous reduction of natural rock phosphates and for similar purposes which is simple in construction and efficient in operation.

Another object of the present invention is to provide a form of apparatus which will operate to reduce the charge in the preheating zone as well as in the final reduction zone and in so doing distribute the burden of reduction throughout the apparatus.

Still another object of the present invention is to provide a form of apparatus which will operate to heat the complete charge in the preheating zone to a reduction temperature and in so doing reduce the amount of energy necessary to be applied in the final reduction zone.

A further defect in the existing forms of reduction apparatus lies in the fact that no thought is given to the means of feeding the charge, which charge is generally fed into the apparatus in a deranged and haphazard state, thus tending to inefficiency in the preheating zone.

Accordingly another object of the present invention is to provide means for feeding the charge in such an orderly state and arrangement that the efficiency of the preheating zone will be greatly enhanced.

Other objects and advantages of the present invention will be apparent from the following detailed description taken in connection with the accompanying drawings in which:

Fig. 1 is a longitudinal vertical section through a furnace constructed in accordance with the present invention;

Fig. 2 is a vertical section of an electric melting pot which constitutes a part of the apparatus according to the present invention;

Fig. 3 is a section of the furnace taken on line 3—3 of Fig. 1;

Fig. 4 is a perspective view of a briquette which is used in charging the furnace;

Fig. 5 is a vertical sectional view of a modification of the furnace according to the present invention;

Fig. 6 is an end view of the furnace shown in Fig. 5 looking from the left of this figure, parts being broken away;

Fig. 7 is a section of the furnace taken on line 7—7 of Fig. 5.

In the drawings, 2 indicates a furnace according to the present invention and which may be operated for the simultaneous production of phosphorus and cement and for similar purposes. The furnace 2 comprises an elongated heating hearth or muffle 4 which is inclined at an angle less than the angle of slip of the charge which is to be fed therethrough. The heating hearth 4 is constructed so as to form therein a passage 6 through which the charge in the form of briquettes 8 is fed and a combustion chamber 10 for the combustion of gases produced within the apparatus. The walls 12 of the passage 6 and the combustion chamber 10 are composed of a dark colored high heat conducting refractory material and are backed up by a layer or series of layers 14 of a light colored heat insulating material. The surfaces of the passage 6 of the combustion chamber 10 are treated with a chromium compound in order to present to the gases produced within the apparatus a surface which will not corrode and also to prevent the charge from sticking while it is being fed through the hearth. Chromic acid has been found to be advantageous for this purpose. On heating, it will break down to chromic oxide, which compound is of great value in producing an anticorrosive surface which is to be subjected to a substance such as phosphorus.

Within the hearth 4 and immediately below the passage 6 are located electrical heating elements 16. There may be any number of these electrical heating elements, and they may be operated in any manner so as to obtain the heat required under the existing conditions. Also within the hearth 4 and immediately above the combustion chamber 10 are located fuel burners 18 which may be operated to give a similar result as the electrical heating elements either by themselves or in conjunction therewith. At the inlet end of the hearth 4 is a pusher mechanism 20 which may be of any well-known type constructed so as to prevent the escape of gases as the charge is fed into the hearth. At the charge inlet end of the hearth 4 is also a conduit 22 leading from the combustion chamber 10 and which acts as an outlet for the gases of combustion.

At the discharge end of the hearth 4 is an electric furnace or melting pot 24 comprising a melting chamber 26 with walls 28 of a dark colored high heat-conducting refractory material, the surfaces of which are treated with a chromium compound such as chromic acid. The material surrounding the walls 28 is composed of a layer or layers 30 of a light colored heat-insulating refractory. Electrodes 32 extend into the melting chamber 26 and form with the material undergoing treatment in the chamber 26 an electric circuit by means of which the material is heated and maintained in a liquid state. At the bottom of the chamber 26 are taps 34 and 36, tap 34 being located at a lower level than tap 36, the purpose of which will be hereinafter explained. At the top of the chamber 26 is an air inlet pipe 38 through which air, which has been preheated in a heat interchanger 40 by means of heat interchange with the hot products of combination being lead out through conduit 22, is introduced into the chamber 26 for the purpose of burning with the gases produced within the apparatus.

In the operation of the apparatus according to the present invention, the charge in the form of briquettes 8 is fed into the charge inlet end of the hearth 4 and is pushed through the passage 6 in a uniform ribbon by means of the pusher mechanism 20. The charge is pushed through the passage 6 slowly and is subjected to a heating action by means of the heating elements 16 or the fuel burners 18 or if a higher temperature is required, a combination of both the heating elements 16 and the burners 18. After passing through the passage 6 the charge falls into the melting chamber 26 and is raised to a still higher temperature by means of the electric current passing through the electrodes 32 and through the charge itself. In the melting chamber 26 the charge is reduced to a liquid and is tapped off at intervals through the tap 36, a sufficient amount of liquid material however being always maintained within the melting chamber to cover the ends of the electrodes and to complete the electric circuit between the electrodes. This is of great importance in that if the liquid material were drained from the chamber 26 leaving only an imperfect contact of solid material between the electrodes there would be a greater period of time required and a greater amount of current necessary to reduce the solid content of the chamber to a liquid state. The metallic substances and impurities which may be present in the charge settle to the bottom of the liquid within the chamber 26 and may be drained off through the tap 34. If the apparatus is operated for the production of substances such as cement, the metallic materials must be drained off in order to prevent them from completing the circuit between the electrodes with a subsequent lowering of resistance and loss of heat.

As the gases which are produced by the heating process both in the passage 6 and the chamber 26 rise to the roof of the melting chamber they are met by a stream of air which has been preheated in heat interchanger 40 and which flows into the chamber 26 through pipe 38. By this means they are burned and the gaseous products and the flames of combustion pass up through the combustion chamber 10 imparting their heat of combustion through wall 12 to passage 6 through which the charge is being fed, thus acting to preheat the same. Once the process is operating efficiently, and the charge is such as to generate combustible gases, it is possible to run without any heating aid from either the electric heating elements 16 or fuel burners 18 and to heat the charge in the passage 6 merely by the heat absorbed from the combustion of the gases in the combustion chamber 10. Such combustion will radiate sufficient heat to raise the charge in passage 6 to the usual necessary temperature.

The gaseous products of combustion will flow from the combustion chamber 10 through the outlet pipe 22 into heat interchanger 40 wherein they impart a portion of their heat to the air which is entering the melting chamber and then are led off for further processing or storage.

Fig. 5 illustrates a modification of the furnace above described. In this drawing 42 indicates a furnace having an elongate heating hearth 44 which is inclined at a angle greater than the angle of slip of the charge which is to be fed therethrough Within the hearth 44 is a passage 46 through which the charge in the form of briquettes 48 are fed and a chamber 50 in which the charge is finally heated and in which the greater portion of the gases are driven off from the charge.

Above the passage 46 is a combustion chamber 52 which is provided with an inlet 54 for the gases driven off from the charge, an air inlet 56 and an outlet 58 for the gaseous products of combustion. Air for the combustion of the gases evolving from the charge is injected into the apparatus through a pipe 60 into a heat interchanger 62 where it absorbs part of the heat of the gaseous products of combustion such gaseous products leaving the combustion chamber through the outlet 58 and pipe 64, and through a pipe 66 into the combustion chamber 52 by way of the inlet 56.

The walls 68 of the passage 46 of the combustion chamber 52 and also the walls of the chamber 50 are composed of a dark colored high heat-conducting refractory material and are backed up by a layer or series of layers 70 of a light colored heat-insulating material. The surfaces of the passage 46, the combustion chamber 52 and the chamber 50 are treated with a chromium compound such as chromic acid in order to prevent sticking of the charge and in order to provide an anti-corrosive surface under the conditions existing in such an apparatus.

Below the chamber 50 are placed electric heating elements 72 for the purpose of raising the charge to the necessary temperature for reaction. The number of such heating elements is not limited and they may extend for the full length of the hearth, heating the charge in passage 46 as well as in the chamber 50. Fuel burners 74 are also provided for heating the charge and may be used by themselves or in conjunction with the electric heating elements. When the charge is such as to generate combustible gases and the combustion of the produced gases is occurring in chamber 52, it has been found that no additional means for heating the passage 46 is required, since the heat of combustion of such gases by itself is sufficient to raise the charge to the necessary temperature before it enters chamber 50.

At the inlet end of the passage 46 is provided a mechanism 76 for feeding the charge. This mechanism may be of any known form, the only provision being however that the charge be fed in such a way that there be no escape of gases during the period of injection.

At the outlet end of the heating hearth are grinders 78 arranged to receive the briquettes 48 as they pass out of the chamber 50. As an integral part of the hearth 44 and at the outlet end thereof is a chamber 80 which also encloses the grinders 78. At the bottom of the chamber is a gate mechanism 84 which acts as a closure between the chamber 80 and a discharge chute 82. Leading into the chamber 80 and directed toward the grinders 78 are gas inlet pipes 86, the purpose of which will hereinafter be described.

The chamber 80 also contains an outlet 88 which connects with a chamber 90. The chamber 90 extends directly beneath and for the full length of the chamber 50 and has a roof 92 in which the bricks are laid rather loosely allowing crevices between the bricks for the escape of gases from the chamber 90 which roof also acts as a base on which the charge slides as it passes through the hearth. The function of the outlet 88 and the chamber 90 will be hereinafter more fully described.

In the operation of this modification of the invention, the charge in the form of briquettes 48 is fed through the charging mechanism 76 into the passage 46 through which, as well as through chamber 50 it slides by gravity. If necessary, the charge is heated by means of fuel burners 74 or electric heating elements 72. If however the apparatus has been in operation for a period and gases are being driven off from the charge, it will be found that the heat of combustion of such gases, which combustion occurs in chamber 52 by means of preheated air entering the chamber through inlet 56, will serve to preheat the charge to a sufficient temperature so as to obviate any additional method of heating the charge while it is passing through passage 46.

As the charge slides through chamber 50 in a uniform relatively thin and wide ribbon, it is heated by electric heating elements 72 and is raised to a sufficient temperature to drive off all the gaseous constituents. These gaseous products flow back through chamber 50 through inlet 54, are burned in the combustion chamber 52 by means of air flowing into the chamber through inlet 56 and leave the chamber 52 through outlet 58. The burning gases flow through the heat interchanger 62 where they preheat the incoming air and are led off through pipe 64 to storage, or further processing.

The spent portion of the charge on reaching the outlet end of the hearth is ground by means of grinders 78 and falls into chamber 80. As the mass of ground material in chamber 80 increases, it is intermittently dropped into chamber 82 by means of the gate mechanism 84 from whence it is discharged directly into a dump car or other conveyor.

In certain processes of production for which the apparatus may be operated, such as for the production of phosphorus, there is a tendency for the charge to react with the gases produced. Such a reaction forms a coating on the surface of the briquetted charge which coating resists any further reaction of the charge unless a much higher temperature is applied. It has been found however that sufficient operation may be had without application of a higher temperature if a stream of inert gas is allowed to come into contact with the charge undergoing treatment. Therefore, in order to maintain an efficient operation of the apparatus at a practically constant temperature by avoiding the formation of a coating on the charge, and in order to allow the reaction of the charge to go to completion, a stream of an inert gas such as nitrogen is introduced into the apparatus through the inlet pipe 86. This gas circulates around the chamber 80 absorbing part of the sensible heat of the spent material which has fallen into the chamber, flows over grinders 78, thus partially cooling them, and then flows into chamber 90 by way of outlet 88, and also into chamber 50 by way of the charge outlet opening. The hot gases in chamber 90 pass through the roof 92 by way of the crevices therein and mix with the gas in chamber 50. In this way the neutral gas while intimately contacting with the briquetted charge sliding through chamber 50, imparts a portion of its heat to the charge and then in mixture with the produced gases, passes through the inlet 54 and the chamber 52 into the pipe 64 and thence to apparatus for further processing or to storage.

Any of the described modifications of the apparatus according to the present invention may be operated for a number of different processes. Although it has been found that the apparatus applies particularly well to a process for the production of prosphoric acid, it has also been found that such apparatus is well adapted to various other reduction and metallurgical processes.

The charge will obviously differ greatly in composition according to the desired product but it has been found that in order to obtain the maximum efficiency of the apparatus, the physical shape of the charge should not vary. A briquetted charge in the form shown in Fig. 4 of the drawings has been found to be of highly practical advantage in operating the apparatus. Such form of charge of relatively very thin cross section and with lateral and longitudinal scoring on both sides thereof will present a large heating surface and, no part of the briquetted charge being far from the surface, it will continuously be raised to substantially the same temperature throughout thus giving greater efficiency in the heating operation.

In both forms of the apparatus according to the present invention, the charge in the form of briquettes such as shown in Fig. 4 is fed in a uniform relatively thin and wide ribbon. It has been found that the high heating efficiency necessary in such apparatus is lacking if the charge is fed into the furnace in a thick layer or in a haphazard manner. In using the form of charge as shown in Fig. 4 and as above described, and in feeding such charge into the apparatus in a uniform ribbon the apparatus will operate at its highest efficiency and the constituents desired will be recovered from the charge with the least possible expenditure of heat energy.

Having thus described the invention, what is claimed as new is:

1. A furnace comprising in combination a stationary sloping heating hearth, electrical resistance heating units for heating a charge being fed through said hearth, means for feeding a charge through said hearth in a uniform, relatively thin and wide ribbon, means for breaking said charge as it leaves said hearth, means at the inlet of said feeding means adapted to allow the feeding of said charge without allowing the escape of gases, means directly connected to the discharge end of said hearth for receiving spent material therefrom, means for regenerating the heat of said spent material, means for heating said charge by the heat thus regenerated, and means for heating said charge by the heat of combustion of the gases developed.

2. A furnace comprising in combination a stationary sloping heating hearth, means for applying heat to said hearth, means for feeding through said hearth a preheated charge in a uniform, relatively thin and wide ribbon, means at the inlet of said feeding means adapted to allow the feeding of said charge without allowing the escape of gases, and means directly connected to the discharge end of said hearth for receiving spent material therefrom.

In testimony whereof I affix my signature.

JOHN D. MORGAN.